No. 850,625. PATENTED APR. 16, 1907.
T. J. COPE.
APPARATUS FOR THREADING OR LAYING ELECTRIC CONDUCTORS
IN CONDUITS OR PIPES.
APPLICATION FILED JUNE 11, 1906.
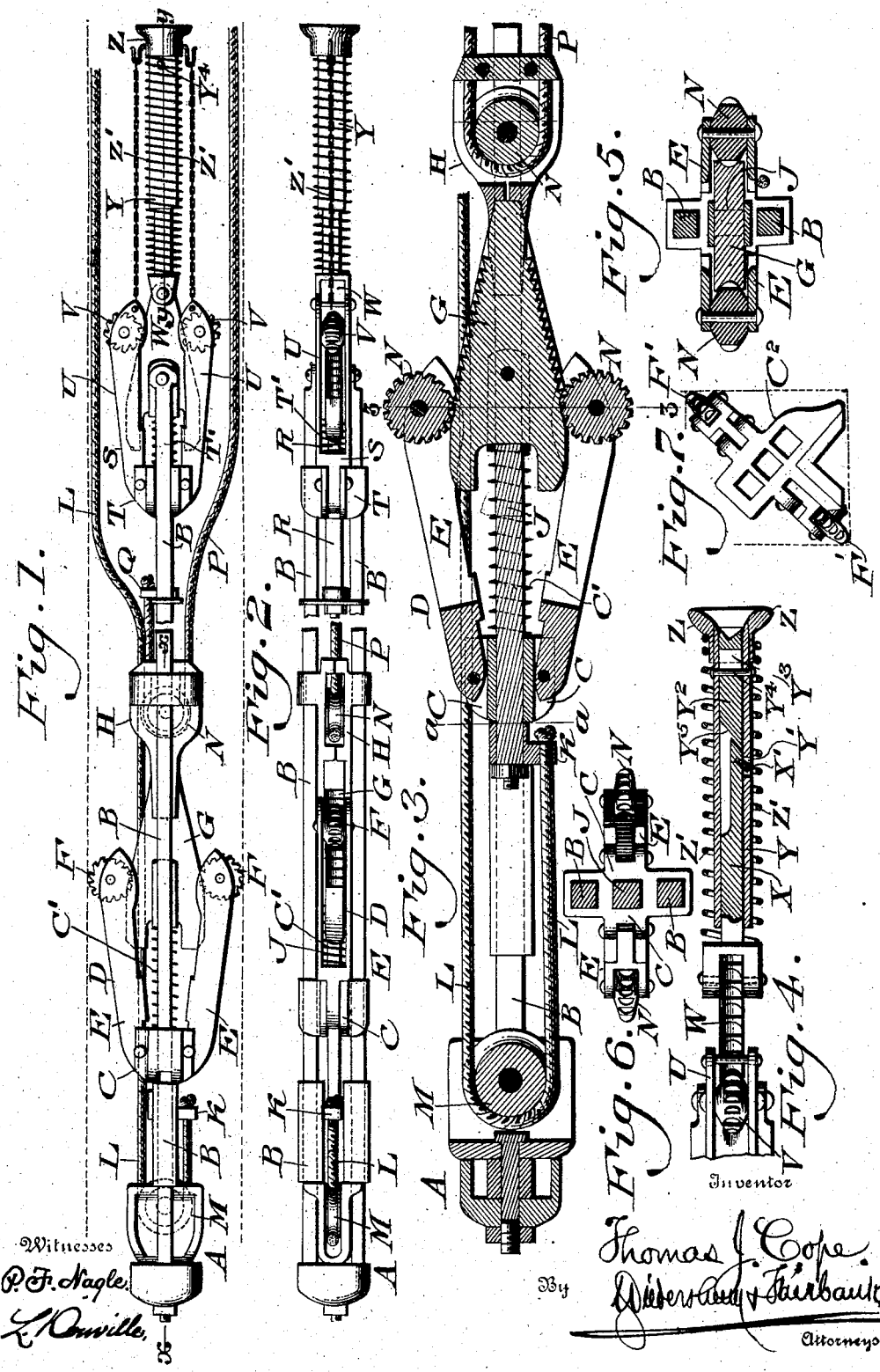

UNITED STATES PATENT OFFICE.

THOMAS J. COPE, OF PHILADELPHIA, PENNSYLVANIA.

APPARATUS FOR THREADING OR LAYING ELECTRIC CONDUCTORS IN CONDUITS OR PIPES.

No. 850,625.   Specification of Letters Patent.   Patented April 16, 1907.

Application filed June 11, 1906. Serial No. 321,117.

*To all whom it may concern:*

Be it known, that I, THOMAS J. COPE, a citizen of the United States, residing in the city and county of Philadelphia, State of Pennsylvania, have invented a new and useful Apparatus for Threading or Laying Electric Conductors in Conduits or Pipes, of which the following is a specification.

My invention consists of an apparatus for threading or laying electric conductors in conduits or pipes, the same embodying improvements as will be hereinafter set forth, and pointed out in the claims.

Figure 1 represents a plan view of an apparatus for threading or laying electric conductors in conduits or pipes embodying my invention. Fig. 2 represents a side elevation thereof. Fig. 3 represents a vertical section on line $x$ $x$, Fig. 1, on an enlarged scale. Fig. 4 represents a longitudinal section of a portion on line $y$ $y$, Fig. 1, on an enlarged scale. Fig. 5 represents a transverse section on line $z$ $z$, Fig. 3. Fig. 6 represents a transverse section on line $a$ $a$, Fig. 3. Fig. 7 represents an end view of a portion employed for angular-shaped conduits or pipes.

Similar letters of reference indicate corresponding parts in the figures.

Referring to the drawings, A designates a cap on the front of the apparatus, from which extends rearwardly the rods B. Fitted on said rods and adapted to slide thereon is the sleeve C of the headpiece D of the device, said piece embodying the arms E, which are pivotally connected with said sleeve C, the rollers F, which are mounted on the rear ends of said arms, the wedge G, and the sleeve H, which latter is connected with the rear end of said wedge and is mounted on said rods B, so as to slide thereon. Projecting forwardly from said wedge is the stem J, which is adapted to pass freely through the front sleeve C and has connected with it by the eye K the cable or rope L, the same passing around the pulley M, which is mounted on the cap A and extends rearwardly to the terminal of the apparatus and beyond the same, so that it may be conveniently operated at the end of the conduit or pipe, it being of sufficient length to extend the required distance of a conduit, it being evident that when said rope is drawn forward motion may be imparted to the headpiece D, the wedge G being advanced, whereby the rollers F occupy a position at the narrow end of said wedge, and so are removed from contact with the wall of the conduit or pipe to which the apparatus is placed.

On the sleeve H is the roller N, around which passes the cable or rope P, one end of which is connected by the eye Q with the stem R at the tailpiece S of the apparatus, which piece consists of the sleeve T, which is freely mounted on the rods B, so as to slide thereon, and carries the pivotal arms U, the rear ends whereof have mounted thereon the rollers V, said stem R having connected with it the wedge W, which is interposed between the arms U and adapted to have the rollers V engage with the sides thereof.

It will now be seen that by proper manipulation of the ropes L V motions are imparted to the head and tail pieces whereby their rollers frictionally engage and interlock alternately with the wall of the conduit or pipe, and said pieces are alternately advanced, and so travel through the conduit, whereby an electric conductor may be carried through the conduit from one end of the same to the other end thereof. It also will be seen that the stems J R and the openings in the sleeves C T, through which the same freely pass, are of angular form in cross-section, guiding the head and tail pieces in their motions and preventing the turning and twisting of the wedges and connected parts, the sides of the wedges where the rollers are recessed or depressed forming cavities and the peripheries of said rollers are round or convex in transverse direction, whereby said peripheries enter said recesses or depressions and are embraced by the walls of the latter. The sides of the arms which carry said rollers also freely embrace the adjacent portion of the wedges, said rollers thus being prevented from leaving said recesses or depressions, and consequently from disengagement and displacement from the wedges.

The wedge of the tailpiece has connected with its rear end the stem X, on which is telescopically fitted the sleeve Y, the rear end of which carries the collar Z, to which latter are hooked or otherwise connected the chains Z', whose forward ends are connected with the rear ends of the arms U. In the side of the sleeve Y is an opening Y', on which is secured the detent X', which is adapted to engage with the wall of the opening Y' for holding the sleeve Y in locked position, as will be hereinafter more fully described. Within the peripheral portion of the sleeve Y is the slide-block $Y^2$, in which is the slot $Y^3$, through which is passed the pin Y⁴, the ends of the latter being secured to said sleeve. The forward end of said block is beveled or tapered, so as to engage with a similarly-shaped end at the rear of the stem X.

It will now be seen that the stem X and sleeve Y are practically connected as one when the detent X' engages with the wall of the opening Y' and the chains Z' are loose, so that they do not interfere with the threading motion of the rollers B, due to the action of the wedge W, nor to the inward closing motion of said rollers. Should, however, the apparatus meet with any obstruction in the conduit, so as to cause it to become necessary to withdraw the same, a rod is inserted into the opening of the collar Z and forced against the slide Y², the action of which is to lift the adjacent end of the stem X and remove the detent X' from the opening Y' of said sleeve, whereby the latter moves rearwardly and tightens the chains Z', the effect of which is to close in the arms U W, and consequently the rollers V, whereby the latter are disengaged from contact with the wall of the conduit or pipe, as shown at the right hand of Fig. 1, and as the apparatus has been manipulated to close in the arms E and rollers F it will be seen that both sets of rollers have been removed from engagement with the wall of the conduit, whereby, as is evident, the apparatus may be readily drawn rearwardly through the conduit, and so removed therefrom.

Where the conduit or pipe is internally of angular form, I employ sleeves C², on which are mounted the roller-carrying arms, the rollers F' being so disposed as to press against and interlock with the angles or corners of said conduit, as shown in Fig. 7.

The rear of the sleeve C has bearing against it the spring C', which also bears against the forward end of the wedge G. The rear of the sleeve T has bearing against it the spring T', which also bears against the forward end of the wedge W, these being necessary adjuncts in connection with the cables or ropes L P for causing intermittent traveling motions to be imparted to the head and tail pieces.

While I have described the rollers F V as such, they need not rotate, as they may be of other form, so long as they constitute shoes adapted to be operated by the wedges to be forced alternately against the wall of the conduit and retained there, so as to cause the head and tail pieces to travel alternately and intermittently in the conduit.

Having thus described my invention, what I claim as new, and desire to secure by Letters Patent, is—

1. In an apparatus of the character stated, a sleeve, a stem therefor, an arm mounted on said sleeve, a shoe journaled on said arm, a wedge with which said stem is connected and means for operating said sleeve, means within the sleeve for interlocking the same with the stem said stem and the opening in said sleeve in which said stem is guided being of angular form.

2. In an apparatus of the character stated, a wedge, a shoe on the side thereof, a sliding device carrying the bearing-piece of said shoe and means for operating said device, said shoe being adapted to contact with said wedge and freely embracing the adjacent portions of the wedge so as to be prevented from lateral disengagement therefrom.

3. In an apparatus of the character stated, a wedge, a shoe on the side thereof, a carrier for said shoe and a sliding device adapted to actuate said carrier, the contacting faces of said wedge and shoe being respectively of concave and convex forms and the carrier having its sides freely embracing the adjacent portions of the wedge, preventing lateral displacement of the shoe from the wedge.

4. In an apparatus of the character stated, a member embodying a shoe and means for moving the same into frictional contact with the wall of a conduit, means for intermittently advancing said member, means for withdrawing said shoe from said contact and independent slidingly-disengageable means for causing such withdrawal in the event of an obstruction in the path of the apparatus, whereby the latter may be run back.

5. In an apparatus of the character stated, a traveling member embodying a shoe, and means for moving the same into frictional contact with the wall of a conduit, means for intermittently advancing said member, means for withdrawing said shoe from said contact and independent slidingly-disengageable means for causing such withdrawal in the event of an obstruction in the path of the apparatus, whereby the latter may be run back.

6. In an apparatus of the character stated, a traveling member, a stem connected therewith, a sleeve on said stem, means within the sleeve for interlocking said sleeve with said stem, and means for releasing said interlocking means.

7. In an apparatus of the character stated, a traveling member provided with a shoe for engaging the wall of a conduit, pieces fitted together so as to slide one on the other, one piece being connected with said member, a detent on one piece in the path of and adapted to engage the other piece, means adapted to release said detent from its place of engagement, a connection with the sliding piece and said member and a spring for moving said sliding piece, whereby said shoe may be withdrawn from its contact with the conduit.

8. In an apparatus of the character stated, a traveling member provided with a shoe adapted for contact with the wall of a conduit, a stem connected therewith, a sleeve telescopically fitted on said stem, a spring bearing against said sleeve to move the same, a connection for said sleeve and member, a slide in said sleeve, means for connecting said slide and sleeve and a detent in the path of said stem for locking said stem with said sleeve, said slide being adapted to engage with the stem to release said detent from said sleeve, whereby the latter is free to move and cause the withdrawal of said shoe from its contact.

9. In an apparatus of the character stated, a member of a traveler provided with a shoe adapted to engage the wall of a conduit, said member and shoe being pivotally mounted and of such construction and arrangement as to conform to and press against and interlock with the angles of a conduit of angular shape.

THOMAS J. COPE.

Witnesses:
JOHN A. WIEDERSHEIM,
S. R. CARR.